United States Patent
Kispert

(10) Patent No.: US 6,217,224 B1
(45) Date of Patent: Apr. 17, 2001

(54) WEAR-RESISTANT RETAINER FOR ROLLER BEARING

(75) Inventor: Klaus Kispert, Schweinfurt (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/392,261

(22) Filed: Sep. 9, 1999

(30) Foreign Application Priority Data

Sep. 9, 1998 (DE) .............................................. 198 41 117

(51) Int. Cl.[7] ...................................................... F16C 33/52
(52) U.S. Cl. ............................ 384/564; 384/572; 384/903
(58) Field of Search ..................................... 384/564, 903, 384/572, 576, 578

(56) References Cited

U.S. PATENT DOCUMENTS 5,000,588   3/1991   Prinz .

*Primary Examiner*—Lenard A. Footland
(74) *Attorney, Agent, or Firm*—Burns, Doane, Swecker & Mathis, L.L.P.

(57) ABSTRACT

A roller bearing includes radially inner and outer bearing rings and rollers disposed radially therebetween. The rollers are retained by at least one plastic guide rim that is snapped into place in one of the bearing rings. An end of the guide rim which faces the rollers is provided with a metallic butting face to resist frictional wear.

7 Claims, 2 Drawing Sheets

WEAR-RESISTANT RETAINER FOR ROLLER BEARING

BRIEF DESCRIPTION OF THE INVENTION

The invention relates to a roller bearing, which on either the outer or inner ring thereof there is provided at least one roller retainer in the form of a plastic guide rim that is snapped into the applicable bearing ring.

In rolling bearings it is generally known to form the metal guide rim of metal manufactured separately from the bearing rings, which are placed in respective grooves in the bearing rings in order to fix and guide the rollers in the axial direction, i.e. in the direction of the roller axis.

From German Document No. 34 26 185-C2, in order to lower the coefficient of friction, it is known to provide a plastic ring, instead of a metal guide rim, snapped into the applicable bearing ring. These plastic rings are simple to make and are easy to assemble and disassemble. At high axial loads, however, they wear quickly. It is therefore also noted in Document 34 26 185-C2 that this bearing is suitable only for relatively low axial loads.

The object of the present invention is to exploit the simple manufacture and ease of assembly of the plastic rings and at the same time to make them more wear-resistant for use under relatively great axial forces.

SUMMARY OF THE INVENTION

According to the invention, this object is attained in that the end of the plastic guide rim facing the rollers is provided with a metal butting face.

Due to this metal butting face, which in a modified form of the invention can preferably be formed by a sheet-metal disk disposed in the end face of the guide rim, the wear between the rollers and the butting faces is substantially reduced.

This sheet-metal disk can be joined to the plastic ring in a known manner by adhesive bonding, potting, or the like. It is expedient, in a further characteristic of the invention, to insert this sheet-metal disk into a recess formed in the end face of the plastic guide rim.

The sheet-metal disk can be stamped from a band. In a modified form of the invention it is also possible to cut the sheet-metal disk from a helical band and to secure this cut-out portion, after being pressed flat, to the plastic ring.

To attain an easily assembled and yet sufficiently solidly seated embodiment, in a modified form of the invention, the plastic ring forming the guide rim has a conical, elastically resilient anchoring lip on its circumferential side facing toward the applicable bearing ring and pointing away from the rollers. The lip is adapted in shape to an annular groove with a sawtoothed profile formed in the applicable bearing ring. Upon insertion of the plastic ring into the bearing ring, the anchoring lip is initially compressed elastically and then relaxes in the annular groove or in other words snaps back to its original shape and functions as a barb. It is understood, however, that it would alternatively be possible to provide two or more annular grooves side by side in the applicable bearing ring and to provide annular beads, instead of the anchoring lip, on the snap-in plastic ring that have a cross section equivalent to the grooves.

The anchoring lip may be continuously annular in shape. However, in a modified form of the invention, it is also possible to provide the anchoring lip with slits distributed over its circumference, or in other words to divide the lip into individual segments, whereby the lip is discontinuously annular. This makes for simpler and easier assembly and disassembly—especially for relatively large bearings.

In a further modified form of the invention, the plastic ring forming the guide rim is provided with a sealing lip that protrudes toward the other (opposed) bearing ring, so that the plastic ring performs the dual function of a guide rim on the one hand and a sealing ring on the other; the sealing lip is intended to slide on the opposed bearing ring or to act as a gap seal. The sealing lip may be embodied in a known way.

BRIEF DESCRIPTION OF THE DRAWINGS

The invention will be described in further detail in conjunction with the accompanying drawing, wherein.

DETAILED DESCRIPTION OF PREFERRED EMBODIMENTS OF THE INVENTION

Figure 1:
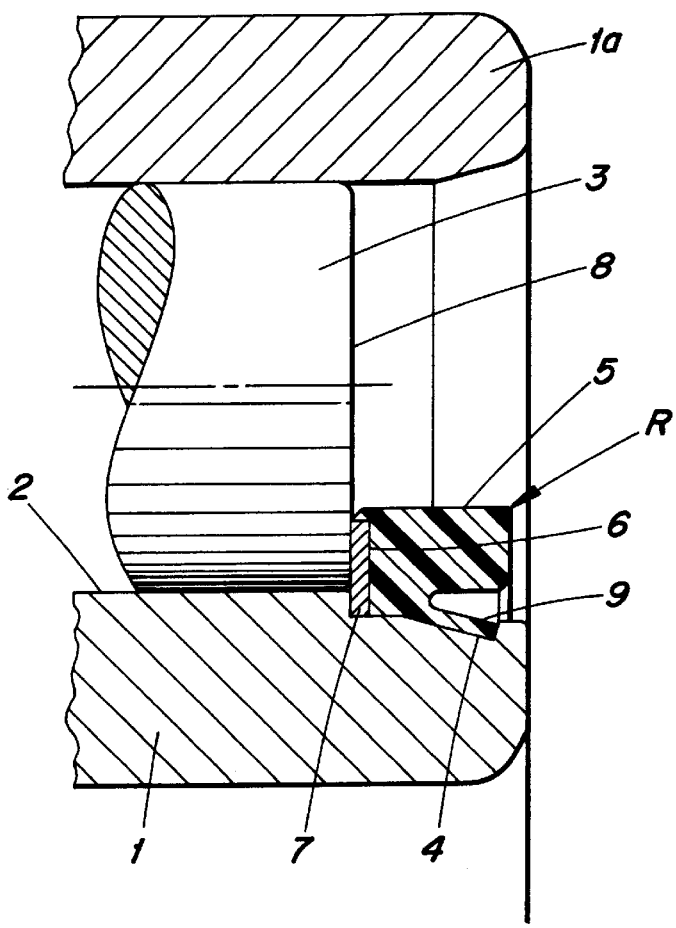
FIG. 1 depicts, in axial section, a first preferred embodiment of the invention wherein a cylindrical-roller bearing is retained by a plastic guide rim, on which a sheet-metal disk is disposed.
Figure 2:
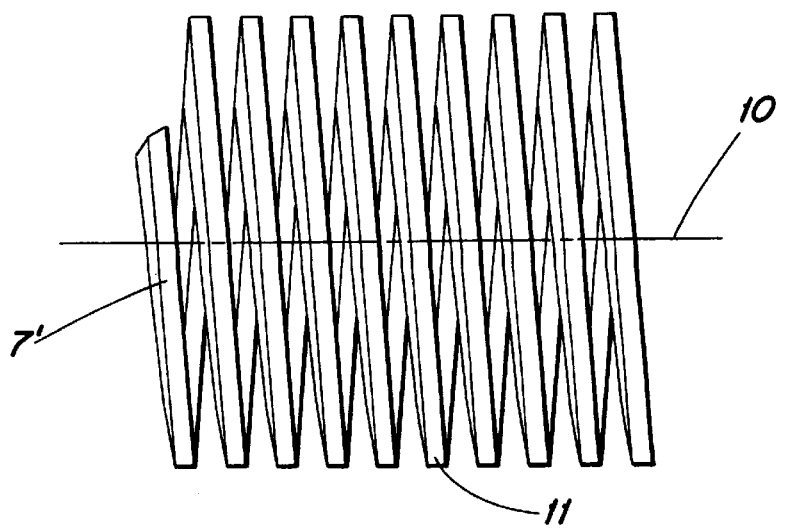
FIG. 2 is a side view of a helical band, from which the sheet-metal disk is cut.

As shown in FIG. 2, an inner ring 1 of a bearing has an annular groove 4 of sawtoothed cross section, located laterally beside the race 2 in which cylindrical rollers 3 (only one depicted) are mounted. A plastic guide rim 5 is snapped into this annular groove. The guide rim 5 is connected to a sheet-metal disk 7, which is inserted into a recess 6 formed in an end face of the guide rim 5. The cylindrical rollers 3 butt up against the sheet-metal disk 7 and are thus guided and retained. On its inner circumferential side facing toward the inner ring 1 of the bearing, the guide rim 5 is provided with a conical, elastically resilient anchoring lip 9, pointing away from the cylindrical rollers 3, that engages an end lip of the annular groove 4 and axially fixes the guide rim 5 in place.

The guide rim 5 and the disk 7 together form a retainer R for retaining the rollers 3. Although only one guide rim 5 is depicted, it will be appreciated that there could be provided another guide rim 5 adjacent the other roller ends.

The sheet metal disks 7 can be formed in any suitable manner. One way is to stamp the disks from a metal band, e.g. sheet steel. Another way is to cut the disks from a helical band of sheet steel 11. The band 11 extends helically about a center axis 10. An annular portion 7' of the band is cut off to form each disk 7. Once cut away, the portion 7' is pressed flat and then joined to the plastic guide 5 in any suitable manner, e.g., adhesive bonding, potting, etc.

Since the disk 7 is formed of a more wear-resistant material than the guide rim 5, the retainer R will last for a longer period.

The invention has been described above merely taking a cylindrical-roller bearing with inserted guide rims as an example. It is understood that it is also possible to provide these guide rims for other types of roller bearings, such as conical-roller, barrel-roller or floating-roller bearings, and the like. Instead of disks 7 made of sheet steel, disks of other metals can be used. The plastic guide rim 5 may, as already noted above, be provided with a sealing lip 5a or the like, which points toward the opposite bearing ring, as depicted in FIG. 3.

Figure 4:
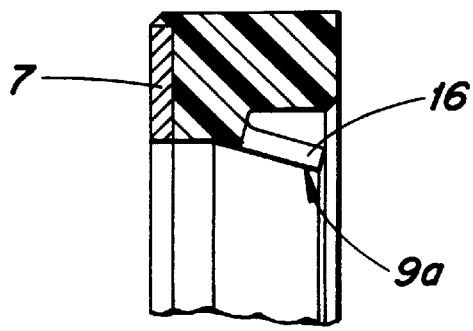
FIG. 4 is an axial sectional view through yet another modified plastic guide rim.

As shown in FIG. 4, the anchoring lip 9a could be divided into individual segments by means of circumferentially spaced slits 16.

Figure 3:
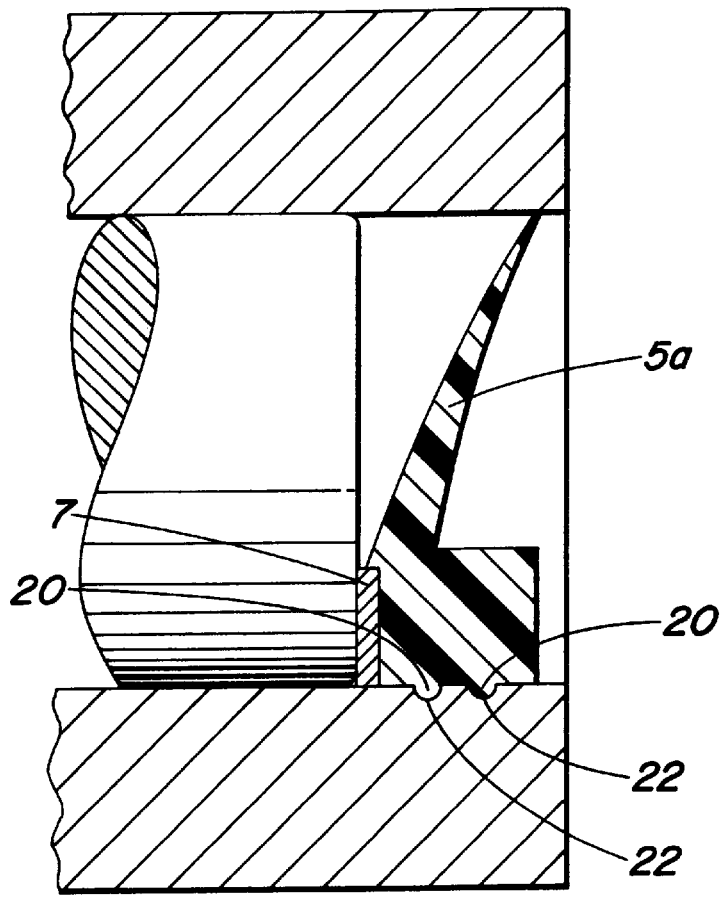
FIG. 3 is an axial sectional view of a cylindrical-roller bearing showing a modified form of plastic guide rim.

In lieu of a sealing lip 9, the guide rim could be provided with axially spaced annular beads 20 which are able to snap into respective annular grooves 22 formed in the bearing ring 20, as shown in FIG. 3.

The retainer R could be mounted in the outer bearing ring 1a instead of the inner bearing ring 1.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A roller bearing comprising radially inner and outer bearing rings, bearing rollers mounted radially between the inner and outer bearing rings, and a retainer for axially retaining the bearing rollers, the retainer including a plastic guide rim configured to be snapped into one of the inner and outer bearing rings, an end of the guide rim facing axially toward an end of the bearing rollers being provided with a metal butting face.

2. The roller bearing according to claim 1, wherein the retainer includes a sheet-metal disk mounted to the guide rim and forming the butting face.

3. The roller bearing according to claim 2 wherein the end of the guide rim includes a recess, the sheet-metal disk being mounted in the recess.

4. The roller bearing according to claim 1 wherein the guide rim includes an elastically resilient anchoring lip projecting away from the bearing rollers and configured to snap into an anchoring groove formed in the one bearing ring.

5. The roller bearing according to claim 4 wherein the anchoring lip is divided into circumferentially spaced segments by slits formed in the anchoring lip in circumferentially spaced relationship.

6. The roller bearing according to claim 4 wherein the guide rim includes an elastically resilient sealing lip arranged to sealingly engage the other of the inner and outer sealing rings.

7. The roller bearing according to claim 1 wherein the guide rim includes an elastically resilient sealing lip arranged to sealingly engage the other of the inner and outer sealing rings.

\* \* \* \* \*